US011538470B2

(12) United States Patent
Kim et al.

(10) Patent No.: US 11,538,470 B2
(45) Date of Patent: Dec. 27, 2022

(54) ELECTRONIC DEVICE FOR PROCESSING USER UTTERANCE AND CONTROLLING METHOD THEREOF

(71) Applicant: Samsung Electronics Co., Ltd., Suwon-si (KR)

(72) Inventors: Sean Minsung Kim, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/946,604

(22) Filed: Jun. 29, 2020

(65) Prior Publication Data

US 2020/0335094 A1  Oct. 22, 2020

Related U.S. Application Data

(63) Continuation of application No. 16/536,226, filed on Aug. 8, 2019, now Pat. No. 10,699,704.

(30) Foreign Application Priority Data

Nov. 7, 2018  (KR) ........................ 10-2018-0135771

(51) Int. Cl.
*G10L 15/22* (2006.01)
*G10L 15/02* (2006.01)
(Continued)

(52) U.S. Cl.
CPC ........ *G10L 15/183* (2013.01); *G10L 15/1815* (2013.01); *G10L 15/22* (2013.01); *G10L 15/30* (2013.01); *G10L 2015/223* (2013.01)

(58) Field of Classification Search
CPC .......... G10L 15/02; G10L 15/22; G10L 15/30
See application file for complete search history.

(56) References Cited

U.S. PATENT DOCUMENTS 6,895,377 B2   5/2005  Kroeker et al.
7,120,585 B2  10/2006  Boulanov
(Continued)

FOREIGN PATENT DOCUMENTS

EP       1791114 A1    5/2007
JP    2002-091477 A    3/2002
(Continued)

OTHER PUBLICATIONS

Notification of the Transmittal of the International Search Report and the Written Opinion of the International Searching Authority, or the Declaration dated Nov. 29, 2019 in connection with International Patent Application No. PCT/KR2019/009716, 10 pages.

(Continued)

*Primary Examiner* — Shreyans A Patel

(57) ABSTRACT

A system includes at least one communication interface, at least one processor operatively connected to the at least one communication interface, and at least one memory operatively connected to the at least one processor and storing a plurality of natural language understanding (NLU) models. The at least one memory stores instructions that, when executed, cause the processor to receive first information associated with a user from an external electronic device associated with a user account, using the at least one communication interface, to select at least one of the plurality of NLU models, based on at least part of the first information, and to transmit the selected at least one NLU model to the external electronic device, using the at least one communication interface such that the external electronic device uses the selected at least one NLU model for natural language processing.

14 Claims, 10 Drawing Sheets

(51) Int. Cl.
   *G10L 15/183* (2013.01)
   *G10L 15/18* (2013.01)
   *G10L 15/30* (2013.01)

(56) References Cited

U.S. PATENT DOCUMENTS

| | | |
|---|---|---|
| 7,139,714 B2 | 11/2006 | Bennett et al. |
| 7,225,125 B2 | 5/2007 | Bennett et al. |
| 7,277,854 B2 | 10/2007 | Bennett et al. |
| 7,647,225 B2 | 1/2010 | Bennett et al. |
| 8,005,680 B2 | 8/2011 | Kommer |
| 8,762,152 B2 | 6/2014 | Bennett et al. |
| 8,949,266 B2 | 2/2015 | Phillips et al. |
| 9,076,448 B2 | 7/2015 | Bennett et al. |
| 9,190,063 B2 | 11/2015 | Bennett et al. |
| 9,275,639 B2 | 3/2016 | Shagalov |
| 9,361,289 B1 | 6/2016 | Jampani et al. |
| 9,773,498 B2 | 9/2017 | Stern et al. |
| 9,818,407 B1 | 11/2017 | Seeker-Walker et al. |
| 10,152,968 B1* | 12/2018 | Agrusa .................. G06F 3/167 |
| 10,504,513 B1* | 12/2019 | Gray .................. G10L 15/1815 |
| 10,685,669 B1* | 6/2020 | Lan ...................... G10L 15/1822 |
| 10,699,704 B2* | 6/2020 | Kim ........................ G10L 15/22 |
| 2001/0037197 A1 | 11/2001 | Boulanov |
| 2001/0049601 A1 | 12/2001 | Kroeker et al. |
| 2005/0080625 A1 | 4/2005 | Bennett et al. |
| 2005/0119896 A1 | 6/2005 | Bennett et al. |
| 2005/0119897 A1 | 6/2005 | Bennett et al. |
| 2005/0144001 A1 | 6/2005 | Bennett et al. |
| 2005/0144004 A1 | 6/2005 | Bennett et al. |
| 2007/0094032 A1 | 4/2007 | Bennett et al. |
| 2008/0021708 A1 | 1/2008 | Bennett et al. |
| 2008/0052063 A1 | 2/2008 | Bennett et al. |
| 2008/0052077 A1 | 2/2008 | Bennett et al. |
| 2009/0313017 A1 | 12/2009 | Nakazawa et al. |
| 2014/0316785 A1 | 10/2014 | Bennett et al. |
| 2015/0120287 A1 | 4/2015 | Stern et al. |
| 2015/0120290 A1 | 4/2015 | Shagalov |
| 2015/0301795 A1 | 10/2015 | Lebrun |
| 2015/0302850 A1 | 10/2015 | Lebrun |
| 2015/0371628 A1* | 12/2015 | Kreifeldt .................. G10L 15/22 704/254 |
| 2016/0225370 A1* | 8/2016 | Kannan .................. G10L 15/005 |
| 2017/0069314 A1 | 3/2017 | Mun |
| 2017/0206903 A1* | 7/2017 | Kim ...................... G10L 15/183 |
| 2018/0061409 A1* | 3/2018 | Valentine ............ G10L 15/1815 |
| 2018/0068663 A1 | 3/2018 | Choi |
| 2018/0174580 A1 | 6/2018 | Kim et al. |
| 2019/0295542 A1* | 9/2019 | Huang .................... G06F 3/167 |
| 2019/0378500 A1* | 12/2019 | Miller .................... G06F 3/167 |

FOREIGN PATENT DOCUMENTS

| | | |
|---|---|---|
| KR | 10-1694011 B1 | 1/2017 |
| WO | 2005/010868 A1 | 2/2005 |
| WO | 2008004663 A1 | 1/2008 |

OTHER PUBLICATIONS

European Patent Office, "Supplementary European Search Report" dated Nov. 9, 2021, in connection with corresponding European Patent Application No. 19882344.5, 11 pages.

\* cited by examiner

ELECTRONIC DEVICE FOR PROCESSING USER UTTERANCE AND CONTROLLING METHOD THEREOF

CROSS-REFERENCE TO RELATED APPLICATIONS

This application is a continuation of application Ser. No. 16/536,226, filed Aug. 8, 2019, which claims priority under 35 U.S.C. § 119 to Korean Patent Application No. 10-2018-0135771, filed on Nov. 7, 2018, in the Korean Intellectual Property Office, the disclosures of which are incorporated by reference herein their entirety.

BACKGROUND

1. Field

The disclosure relates to a technology for processing a user utterance.

2. Description of Related Art

In addition to a conventional input scheme using a keyboard or a mouse, electronic devices have recently supported various input schemes such as a voice input and the like. For example, the electronic devices such as a smartphone or a tablet PC may recognize the voice of a user input in a state where a speech recognition service is executed and may execute an action corresponding to a voice input or may provide the result found depending on the voice input.

Nowadays, the speech recognition service is being developed based on a technology processing a natural language. The technology processing the natural language refers to a technology that grasps the intent of the user utterance and provides the user with the result suitable for the intent.

The above information is presented as background information only to assist with an understanding of the disclosure. No determination has been made, and no assertion is made, as to whether any of the above might be applicable as prior art with regard to the disclosure.

SUMMARY

Due to hardware limitations, a user terminal may process only voice inputs of the limited number. The user terminal may transmit another voice input other than the voice inputs of the limited number to an external server, may receive the response, and may process the received voice input. The voice inputs of the limited number may be configured to be processed by the user terminal, as the voice that a user is expected to enter frequently. As such, the user terminal may increase the overall voice input processing speed. However, because the voice entered frequently for each user is different and the voice input entered frequently as time goes on is changed in spite of the same user, the overall voice input processing speed may not increase depending on a user.

The user terminal according to various embodiments of the present disclosure may provide a user with the personalized voice input processing system, using user information.

Aspects of the disclosure are to address at least the above-mentioned problems and/or disadvantages and to provide at least the advantages described below.

In accordance with an aspect of the disclosure, a system may include at least one communication interface, at least one processor operatively connected to the at least one communication interface, and at least one memory operatively connected to the at least one processor and storing a plurality of natural language understanding (NLU) models. The at least one memory may store instructions that, when executed, cause the processor to receive first information associated with a user from an external electronic device associated with a user account, using the at least one communication interface, to select at least one of the plurality of NLU models, based on at least part of the first information, and to transmit the selected at least one NLU model to the external electronic device, using the at least one communication interface such that the external electronic device uses the selected at least one NLU model for natural language processing.

In accordance with another aspect of the disclosure, a controlling method of a system for updating an NLU model may include receiving first information associated with a user from an external electronic device associated with a user account, selecting at least one of the plurality of NLU models, based on at least part of the first information, and transmitting the selected at least one NLU model to the external electronic device, using at least one communication interface such that the external electronic device uses the selected at least one NLU model for natural language processing.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
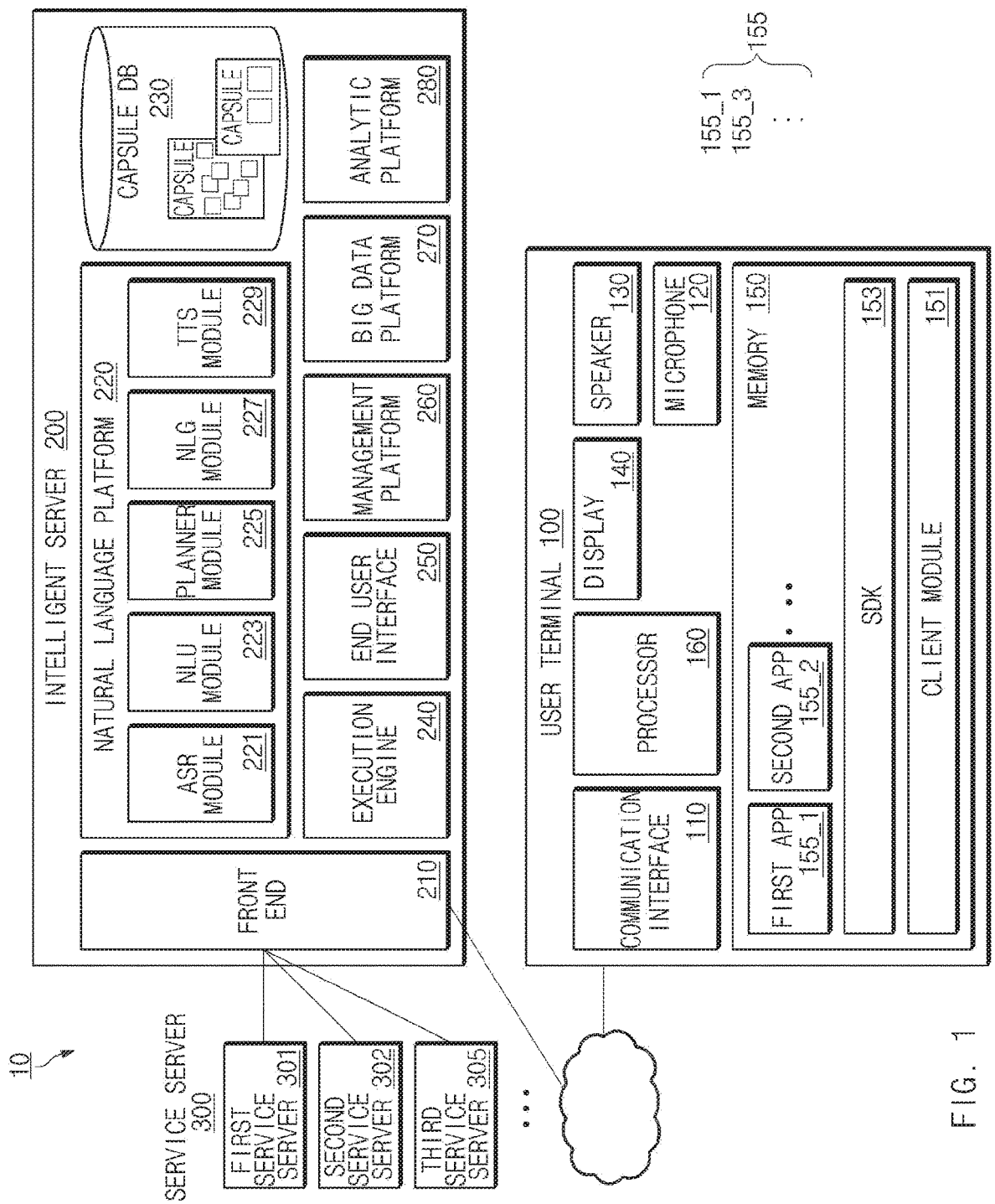
FIG. 1 is a block diagram illustrating an integrated intelligence system, according to an embodiment.

FIG. 1 is a block diagram illustrating an integrated intelligence system, according to an embodiment.

Referring to FIG. 1, an integrated intelligence system 10 according to an embodiment may include a user terminal 100, an intelligent server 200, and a service server 300.

The user terminal 100 according to an embodiment may be a terminal device (or an electronic device) capable of connecting to Internet, and may be, for example, a mobile phone, a smartphone, a personal digital assistant (PDA), a notebook computer, TV, a white household appliance, a wearable device, a head mount display (HMD), or a smart speaker.

According to an embodiment, the user terminal 100 may include a communication interface 110, a microphone 120, a speaker 130, a display 140, a memory 150, and a processor 160. The listed components may be operatively or electrically connected to one another.

According to an embodiment, the communication interface 110 may be configured to transmit or receive data to or from an external device. According to an embodiment, the microphone 120 may receive a sound (e.g., a user utterance) to convert the sound into an electrical signal. According to an embodiment, the speaker 130 may output the electrical signal as a sound (e.g., voice). According to an embodiment, the display 140 may be configured to display an image or a video. According to an embodiment, the display 140 may display the graphic user interface (GUI) of the running app (or an application program).

According to an embodiment, the memory 150 may store a client module 151, a software development kit (SDK) 153, and a plurality of apps 155. The client module 151 and the SDK 153 may constitute a framework (or a solution program) for performing general-purposed functions. Furthermore, the client module 151 or the SDK 153 may constitute the framework for processing a voice input.

According to an embodiment, the plurality of apps 155 in the memory 150 may be a program for performing the specified function. According to an embodiment, the plurality of apps 155 may include a first app 155_1 and a second app 155_3. According to an embodiment, each of the plurality of apps 155 may include a plurality of actions for performing the specified function. For example, a plurality of apps 155 may include at least one of an alarm app, a message app, or a schedule app. According to an embodiment, the plurality of apps 155 may be executed by the processor 160 to sequentially execute at least part of the plurality of actions.

According to an embodiment, the processor 160 may control overall operations of the user terminal 100. For example, the processor 160 may be electrically connected to the communication interface 110, the microphone 120, the speaker 130, the display 140, and the memory 150 to perform a specified action.

According to an embodiment, the processor 160 may also execute the program stored in the memory 150 to perform the specified function. For example, the processor 160 may execute at least one of the client module 151 or the SDK 153 to perform the following actions for processing a voice input. The processor 160 may control the actions of the plurality of apps 155 via the SDK 153. The following actions described as the actions of the client module 151 or the SDK 153 may be the action by the execution of the processor 160.

According to an embodiment, the client module 151 may receive a voice input. For example, the client module 151 may receive a voice signal corresponding to a user utterance detected via the microphone 120. The client module 151 may transmit the received voice input to the intelligent server 200. According to an embodiment, the client module 151 may transmit the state information of the user terminal 100 together with the received voice input, to the intelligent server 200. For example, the state information may be the execution state information of an app.

According to an embodiment, the client module 151 may receive the result corresponding to the received voice input. For example, the client module 151 may receive the result corresponding to the received voice input from the intelligent server 200. The client module 151 may display the received result in the display 140.

According to an embodiment, the client module 151 may receive the plan corresponding to the received voice input. The client module 151 may display the result of executing a plurality of actions of an app in the display 140 depending on the plan. For example, the client module 151 may sequentially display the execution result of a plurality of actions in a display. For another example, the user terminal 100 may display only a part of results (e.g., the result of the last action) of executing a plurality of actions, on the display.

According to an embodiment, the client module 151 may receive a request for obtaining information necessary to calculate the result corresponding to a voice input, from the intelligent server 200. For example, the information necessary to calculate the result may be the state information of the user terminal 100. According to an embodiment, the client module 151 may transmit the necessary information to the intelligent server 200 in response to the request.

According to an embodiment, the client module 151 may transmit information about the result of executing a plurality of actions depending on the plan, to the intelligent server 200. The intelligent server 200 may determine that the received voice input is processed correctly, through the result information.

According to an embodiment, the client module 151 may include a voice recognition module. According to an embodiment, the client module 151 may recognize a voice input to perform the limited function, via the voice recognition module. For example, the client module 151 may launch an intelligent app that processes a voice input for performing an organic action, via a specified input (e.g., wake up!).

According to an embodiment, the intelligent server 200 may receive the information associated with a user's voice input from the user terminal 100 over a communication network. According to an embodiment, the intelligent server 200 may change the data associated with the received voice input to text data. According to an embodiment, the intelligent server 200 may generate a plan for performing a task corresponding to a user voice input, based on the text data.

According to an embodiment, the plan may be generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the plan may be selected from a set of predefined plans or may be generated in real time in response to a user request. For example, the AI system may select at least one plan of the plurality of predefined plans.

According to an embodiment, the intelligent server 200 may transmit the result calculated depending on the generated plan to the user terminal 100 or may transmit the generated plan to the user terminal 100. According to an embodiment, the user terminal 100 may display the result calculated depending on the plan, on a display. According to an embodiment, the user terminal 100 may display the result of executing the action according to the plan, on the display.

The intelligent server 200 according to an embodiment may include a front end 210, a natural language platform 220, a capsule DB 230, an execution engine 240, an end user interface 250, a management platform 260, a big data platform 270, and an analytic platform 280.

According to an embodiment, the front end 210 may receive a voice input received from the user terminal 100. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, and a text to speech module (TTS) module 229.

According to an embodiment, the ASR module 221 may convert the voice input received from the user terminal 100 to text data. According to an embodiment, the NLU module 223 may grasp the intent of the user, using the text data of the voice input. For example, the NLU module 223 may grasp the intent of the user by performing syntactic analysis or semantic analysis. According to an embodiment, the NLU module 223 may grasp the meaning of words extracted from the voice input by using linguistic features (e.g., syntactic elements) such as morphemes or phrases and may determine the intent of the user by matching the grasped meaning of the words to an intent.

According to an embodiment, the planner module 225 may generate the plan by using the intent and a parameter, which are determined by the NLU module 223. According to an embodiment, the planner module 225 may determine a plurality of domains necessary to perform a task, based on the determined intent. The planner module 225 may determine a plurality of actions included in each of the plurality of domains determined based on the intent. According to an embodiment, the planner module 225 may determine the parameter necessary to perform the determined plurality of actions or the result value output by the execution of the plurality of actions. The parameter and the result value may be defined as a concept associated with the specified form (or class). As such, the plan may include the plurality of actions and a plurality of concepts determined by the intent of the user. The planner module 225 may determine the relationship between the plurality of actions and the plurality of concepts stepwise (or hierarchically). For example, the planner module 225 may determine the execution sequence of the plurality of actions, which are determined based on a user's intent, based on the plurality of concepts. In other words, the planner module 225 may determine the execution sequence of the plurality of actions, based on the parameters necessary to perform the plurality of actions and the result output by the execution of the plurality of actions. As such, the planner module 225 may generate a plan including information (e.g., ontology) of the relationship between a plurality of actions and a plurality of concepts. The planner module 225 may generate the plan, using the information stored in the capsule DB 230 storing a set of relationships between concepts and actions.

According to an embodiment, the NLG module 227 may change the specified information into information in the text form. The information changed to the text form may be a form of a natural language utterance. The TTS module 229 according to an embodiment may change information of the text form to information of a voice form.

According to an embodiment, the capsule DB 230 may store information about the relationship between the actions and the plurality of concepts corresponding to a plurality of domains. For example, the capsule DB 230 may store a plurality of capsules including a plurality of action objects (or action information) and concept objects (or concept information) of the plan. According to an embodiment, the capsule DB 230 may store the plurality of capsules in the form of a concept action network (CAN). According to an embodiment, the plurality of capsules may be stored in the function registry included in the capsule DB 230.

According to an embodiment, the capsule DB 230 may include a strategy registry that stores strategy information necessary to determine a plan corresponding to a voice input. The strategy information may include reference information for determining a single plan when there are a plurality of plans corresponding to the voice input. According to an embodiment, the capsule DB 230 may include a follow up registry that stores the information of the follow-up action for suggesting a follow-up action to the user in the specified context. For example, the follow-up action may include a follow-up utterance. According to an embodiment, the capsule DB 230 may include a layout registry for storing layout information of the information output via the user terminal 100. According to an embodiment, the capsule DB 230 may include a vocabulary registry that stores vocabulary information included in the capsule information. According to an embodiment, the capsule DB 230 may include a dialog registry that stores information about dialog (or interaction) with the user.

According to an embodiment, the capsule DB 230 may update the stored object via a developer tool. For example, the developer tool may include a function editor for updating an action object or a concept object. The developer tool may include a vocabulary editor for updating the vocabulary. The developer tool may include a strategy editor that generates and registers a strategy for determining the plan. The developer tool may include a dialog editor that creates a dialog with the user. The developer tool may include a follow up editor capable of activating the follow-up target and editing the follow-up utterance for providing a hint. The follow-up target may be determined based on the currently set target, the preference of the user, or environment condition.

According to an embodiment, the capsule DB 230 may be implemented in the user terminal 100. In other words, the user terminal 100 may include the capsule DB 230 storing information for determining the action corresponding to the voice input.

According to an embodiment, the execution engine 240 may calculate the result, using the generated plan. According to an embodiment, the end user interface 250 may transmit the calculated result to the user terminal 100. As such, the user terminal 100 may receive the result and may provide the user with the received result. According to an embodiment, the management platform 260 may manage information used by the intelligent server 200. According to an embodiment, the big data platform 270 may collect data of the user. According to an embodiment, the analytic platform 280 may manage the quality of service (QoS) of the intelligent server 200. For example, the analytic platform 280 may manage the component and processing speed (or efficiency) of the intelligent server 200.

According to an embodiment, the service server 300 may provide the user terminal 100 with a specified service (e.g., food order or hotel reservation). According to an embodiment, the service server 300 may be a server operated by the third party. For example, the service server 300 may include a first service server 301, a second service server 302, and a third service server 305, which are operated by different third parties. According to an embodiment, the service server 300 may provide the intelligent server 200 with information for generating a plan corresponding to the received voice input. For example, the provided information may be stored in the capsule DB 230. Furthermore, the service server 300 may provide the intelligent server 200 with result information according to the plan.

In the above-described integrated intelligence system 10, the user terminal 100 may provide the user with various intelligent services in response to a user input. The user input may include, for example, an input through a physical button, a touch input, or a voice input.

According to an embodiment, the user terminal 100 may provide a speech recognition service via an intelligent app (or a speech recognition app) stored therein. In this case, for example, the user terminal 100 may recognize the user utterance or the voice input received via the microphone and may provide the user with a service corresponding to the recognized voice input.

According to an embodiment, the user terminal 100 may perform a specified action, based on the received voice input, exclusively, or together with the intelligent server and/or the service server. For example, the user terminal 100 may execute an app corresponding to the received voice input and may perform the specified action via the executed app.

According to an embodiment, when the user terminal 100 provides a service together with the intelligent server 200 and/or the service server, the user terminal may detect a user utterance, using the microphone 120 and may generate a signal (or voice data) corresponding to the detected user utterance. The user terminal may transmit the voice data to the intelligent server 200, using the communication interface 110.

According to an embodiment, the intelligent server 200 may generate a plan for performing a task corresponding to the voice input or the result of performing an action depending on the plan, as the response to the voice input received from the user terminal 100. For example, the plan may include a plurality of actions for performing the task corresponding to the voice input of the user and a plurality of concepts associated with the plurality of actions. The concept may define a parameter to be input for the execution of the plurality of actions or a result value output by the execution of the plurality of actions. The plan may include relationship information between a plurality of actions and a plurality of concepts.

According to an embodiment, the user terminal 100 may receive the response, using the communication interface 110. The user terminal 100 may output the voice signal generated in user terminal 100, to the outside using the speaker 130 or may output an image generated in the user terminal 100, to the outside using the display 140.

Figure 2:
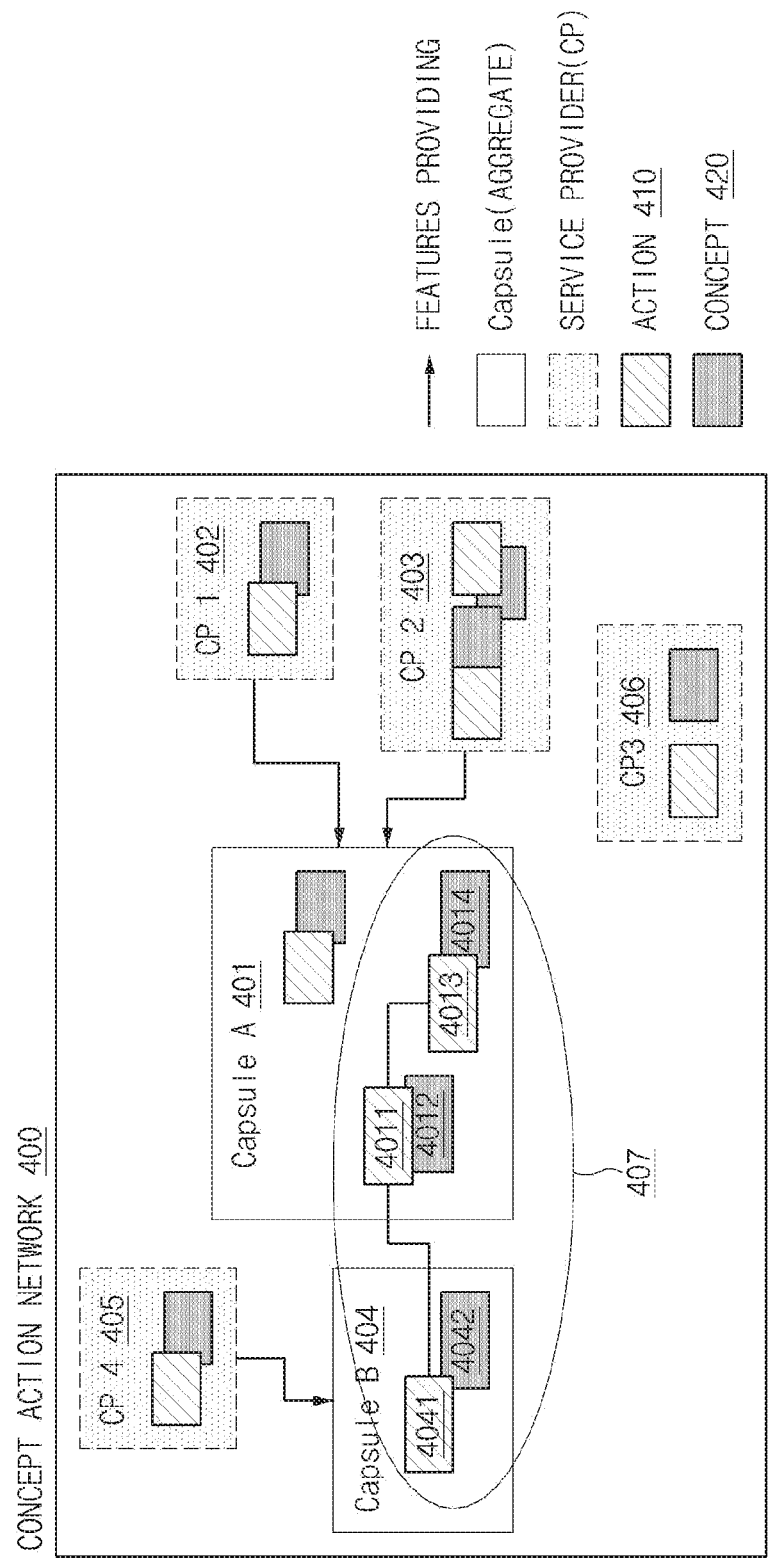
FIG. 2 is a diagram illustrating the form in which relationship information between a concept and an action is stored in a database, according to an embodiment.

FIG. 2 is a diagram illustrating the form in which relationship information between a concept and an action is stored in a database, according to various embodiments.

The capsule database (e.g., the capsule DB 230) of the intelligent server 200 may store a plurality of capsules in the form of a concept action network (CAN) 400. The capsule database may store an action for processing a task corresponding to a voice input and a parameter necessary for the action, in the CAN form. The CAN may indicate an organic relationship between the action and a concept defining the parameter necessary to perform the action.

The capsule database may store a plurality of capsules (e.g., capsule A 401 and capsule B 402) respectively corresponding to a plurality of domains (e.g., applications). According to an embodiment, a single capsule (e.g., the capsule A 401) may correspond to one domain (e.g., an application). Furthermore, the single capsule may correspond to at least one service provider (e.g., CP 1 402, CP 2

403, CP 3 406, or CP 4 405) for performing the function of the domain associated with the capsule. According to an embodiment, the single capsule may include at least one or more actions 410 and at least one or more concepts 420 for performing a specified function.

According to an embodiment, the natural language platform 220 may generate a plan for performing a task corresponding to the received voice input, using the capsule stored in the capsule database. For example, the planner module 225 of the natural language platform may generate a plan, using the capsule stored in the capsule database. For example, a plan 407 may be generated using actions 4011 and 4013 and concepts 4012 and 4014 of the capsule A 401 and an action 4041 and a concept 4042 of the capsule B 402.

Figure 3:
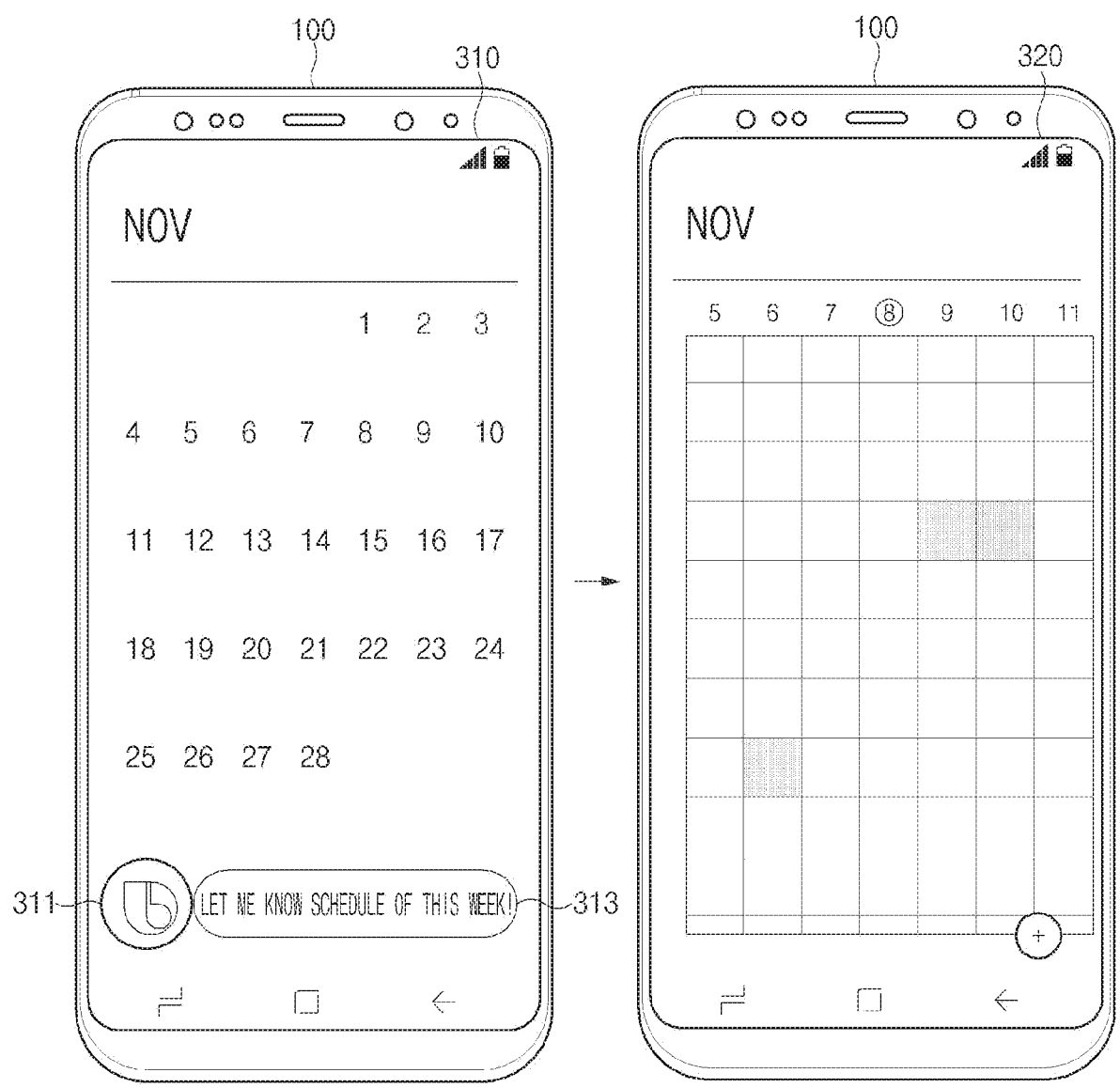
FIG. 3 is a view illustrating a user terminal displaying a screen of processing a received voice input through an intelligent app, according to an embodiment.

FIG. 3 is a view illustrating a screen in which a user terminal processes a received voice input through an intelligent app, according to various embodiments.

The user terminal 100 may execute an intelligent app to process a user input through the intelligent server 200.

According to an embodiment, in screen 310, when recognizing a specified voice input (e.g., wake up!) or receiving an input via a hardware key (e.g., the dedicated hardware key), the user terminal 100 may launch an intelligent app for processing a voice input. For example, the user terminal 100 may launch an intelligent app in a state in which a schedule app is being executed. According to an embodiment, the user terminal 100 may display an object (e.g., an icon) 311 corresponding to the intelligent app, in the display 140. According to an embodiment, the user terminal 100 may receive a voice input by a user utterance. For example, the user terminal 100 may receive a voice input saying that "Let me know the schedule of this week!". According to an embodiment, the user terminal 100 may display a user interface (UI) 313 (e.g., an input window) of an intelligent app, in which text data of the received voice input is displayed, in a display According to an embodiment, in screen 320, the user terminal 100 may display the result corresponding to the received voice input, in the display. For example, the user terminal 100 may receive the plan corresponding to the received user input and may display 'the schedule of this week' in the display depending on the plan.

Figure 4A:
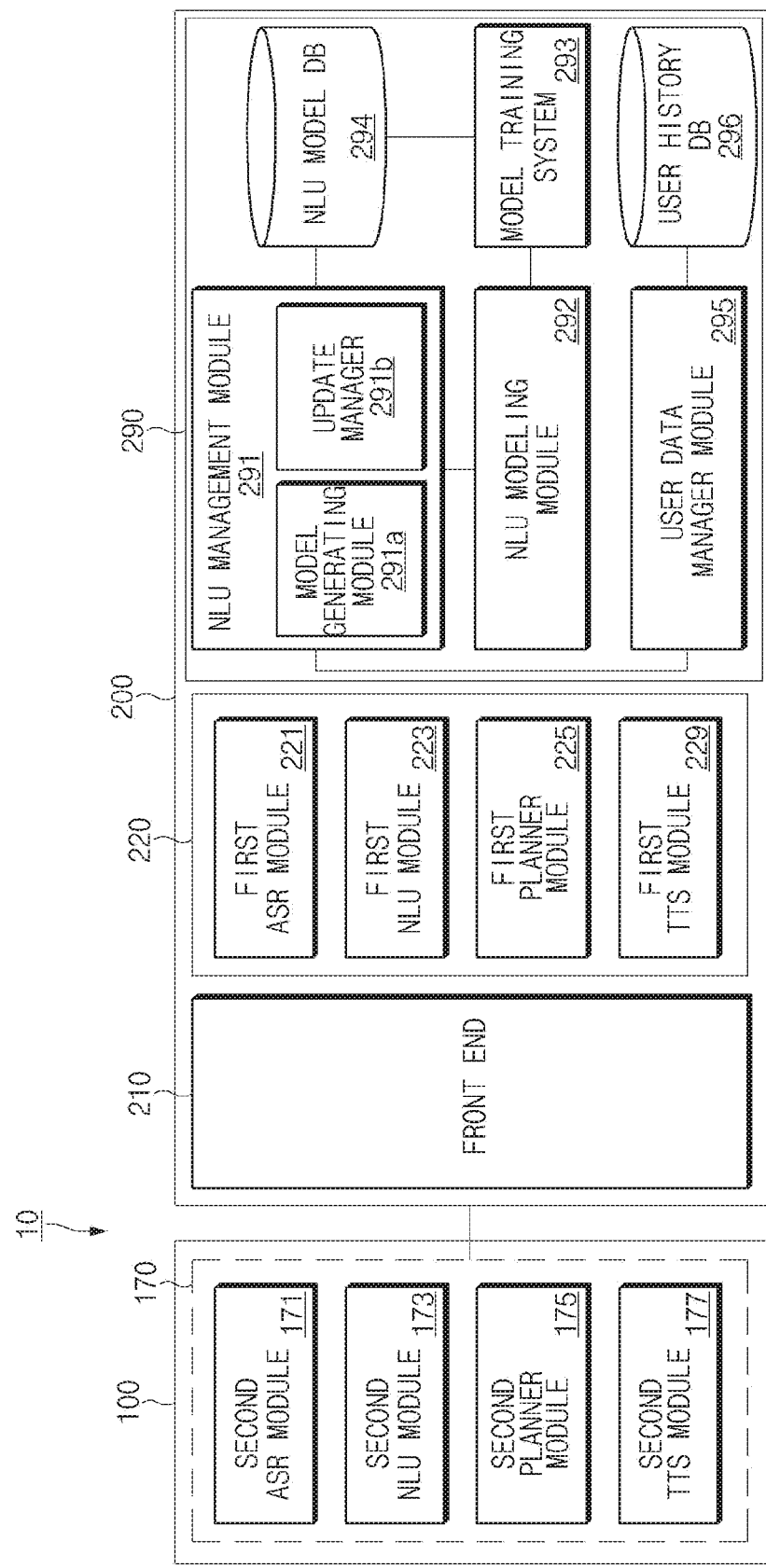
FIG. 4A illustrates an intelligence system including a plurality of natural language platforms, according to an embodiment.

FIG. 4A illustrates an intelligence system including a plurality of natural language platforms, according to an embodiment.

Referring to FIG. 4A, the integrated intelligence system 10 may include the user terminal 100 and the intelligent server 200.

According to an embodiment, each of the user terminal 100 and the intelligent server 200 may include natural language platforms 170 and 220. In other words, in addition to the intelligent server 200, the user terminal 100 may include the second natural language platform 170 for processing the received voice input. For example, the user terminal 100 may include an on device natural language understanding module 173. According to an embodiment, the natural language platforms 170 and 220 of the intelligent server 200 and the user terminal 100 may process the voice input received complementarily. For example, the second natural language platform 170 of the user terminal 100 may process a part of voice inputs capable of being processed by the first natural language platform 220 of the intelligent server 200. In other words, the second natural language platform 170 of the user terminal 100 may process the limited voice input, compared with the first natural language platform 220 of the intelligent server 200.

According to an embodiment, the intelligent server 200 may process the voice input received from the user terminal 100. Furthermore, the intelligent server 200 may change (or upgrade) the voice input processed by the second natural language platform 170 of the user terminal 100.

According to an embodiment, the intelligent server 200 may include the front end 210, the first natural language platform 220, and an NLU management module 290. The intelligent server 200 may be illustrated while a part of components of the intelligent server 200 of FIG. 1 is omitted. In other words, the intelligent server 200 may further include the remaining components of the intelligent server 200.

According to an embodiment, the intelligent server 200 may include a communication interface, a memory, and a processor. The processor may transmit or receive data (or information) to or from an external electronic device (e.g., the user terminal 100) through the communication interface. The processor may execute instructions stored in the memory to perform the actions of the front end 210, the first natural language platform 220, and the NLU management module 290.

According to an embodiment, the front end 210 is connected to the user terminal 100 to receive information associated with a user. For example, the information associated with the user may include at least one of the user's voice input, information of the user terminal 100, or the user's preference information.

According to an embodiment, the first natural language platform 220 may process the user's voice input. The first natural language platform 220 may not be limited to a specific voice input and may process various voice inputs. According to an embodiment, the first natural language platform 220 may include the first ASR module 221, the first NLU module 223, the first planner module 225, and a first TTS module 229.

According to an embodiment, the first ASR module 221 may generate text data corresponding to the received voice input. The first NLU module 223 may determine the user's intent and a parameter, using the text data. The first planner module 225 may generate the plan corresponding to the received voice input. The plan may be determined based on the determined intent and the determined parameter. According to an embodiment, the intelligent server 200 may calculate the result using the generated plan and may transmit the calculated result to the user terminal 100. Furthermore, the intelligent server 200 may directly transmit the generated plan to the user terminal 100. The user terminal 100 may sequentially perform specified actions based on the plan.

According to an embodiment, the first TTS module 229 may generate a voice signal for interacting with a user. According to an embodiment, the first TTS module 229 may convert the text data into a voice signal. According to an embodiment, the user terminal 100 may receive the voice signal from the intelligent server 200 to output guide information.

According to an embodiment, the NLU management module 290 may manage the second NLU module 173 of the user terminal 100. For example, the NLU management module 290 may manage an NLU module (e.g., the second NLU module 173) of at least one electronic device.

According to an embodiment, the NLU management module 290 may select at least one of NLU models based on at least part of information associated with a user and may transmit the selected at least one NLU model to the user terminal 100.

According to an embodiment, the NLU management module 290 may include an NLU management module 291, an NLU modeling module 292, a model training system 293, an NLU model database (DB) 294, a user data manager module 295, and a user history DB 296.

According to an embodiment, the NLU management module 291 may determine whether to change (or update) an NLU model used by the second NLU module 173 of the user terminal 100. The NLU management module 291 may receive at least one voice input from the user data manager module 295 and may determine whether to change the NLU model based on the received voice input.

According to an embodiment, the NLU management module 291 may include a model generating manager 291*a* and an update manager 291*b*. According to an embodiment, when the model generating manager 291*a* determines to change the NLU model of the user terminal 100, the model generating manager 291*a* may transmit an NLU model generation request to the NLU modeling module 292. According to an embodiment, the update manager 291*b* may transmit the generated NLU model to the user terminal 100.

According to an embodiment, when receiving the NLU generation request, the NLU modeling module 292 may generate an NLU model for recognizing a specified intent through the model training system 293. According to an embodiment, the model training system 293 may repeatedly perform the training of a model for recognizing the specified intent. As such, the model training system 293 may generate an NLU model for accurately recognizing the specified intent. According to an embodiment, the generated NLU model may include an intent set for recognizing a plurality of intents. In other words, the generated NLU model may correspond to intents of the specified number. According to an embodiment, the generated NLU model may be stored in the NLU model DB 294. According to an embodiment, the update manager 291*b* of the NLU management module 291 may transmit the NLU model stored in the NLU model DB 294 to the user terminal 100.

According to an embodiment, the user data manager module 295 may store the information associated with the user received from the user terminal 100, in the user history DB 296. For example, the information associated with the user may include at least one of the user's voice input, information of the user terminal 100, or the user's preference information. For example, the user terminal 100 may be a device that is logged in with a user account. As such, the information of the user terminal 100 may include information (e.g., identification information or setting information) of the logged-in user. According to an embodiment, the user data manager module 295 may store the information of the user terminal 100 in the user history DB 296. According to an embodiment, the user data manager module 295 may store processed information of the received voice input, in the user history DB 296. For example, the user data manager module 295 may store information associated with the intent of the recognized voice input, in the user history DB 296. For example, the information associated with the intent may include user log information. According to an embodiment, the user data manager module 295 may store preference information. For example, the preference information may include the app selected by a user or information about an intent.

According to an embodiment, the user data manager module 295 may analyze information associated with the user stored in the user history DB 296. For example, the user data manager module 295 may identify the intent processed by the user terminal 100 by analyzing the user log. For example, as illustrated in Table 1, the user log may include identification information of a plan, information about the name of an app, information about a user utterance, or the like. The user data manager module 295 may determine the recognized intent, using the identification information of a plan included in log information.

TABLE 1

```
{
"body": {
"commandType": 1,
"pathRule": {
"apps": [ ],
"isRoot": true,
"pathRuleId": "Gallery_101", // the identifier of a plan
"seqNums": 3,
"states": [{
"appName": "Gallery", // the name of an app
"parameters": [{
"parameterName": "title",
"slotName": "title",
"slotNum": 0,
"slotValue": "document"
}, {
"parameterName": "searchContentType",
"slotName": "searchContentType",
"slotNum": 1,
"slotValue": "image"
}],
"seqNum": 3,
"stateId": " SearchViewResult"
}],
"utterance": "find document pictures in a gallery" // user utterance
},
"category": "pathrule_result"
},
"header": {
"appName": "",
"appVersion": "",
"specVersion": "0.72",
"timestamp": 1498809446662,
"lang": "ko_KR",
"tpo_app": "com.sec.android.app.launcher",
"tpo_dofw": "6",
"tpo_hour": "16",
"tpo_plc_geohash": "wyd7gn",
"tpo_plc_id":
"WORK,DAILY_LIVING_AREA,HOME_COUNTRY",
"tpo_yyyymmdd": "20170630"
}
}
```

According to an embodiment, the user data manager module 295 may extract information about the intent corresponding to a specified condition, from the user history DB 296. For example, the user data manager module 295 may extract information (e.g., top 20 intents) about at least one intent, which is recognized at a high frequency during a specified period (e.g., one week). For another example, the user data manager module 295 may extract information about an intent used at a specific location (or place). For another example, the user data manager module 295 may extract information about the intent included in a domain corresponding to a specific app (or an application program). For another example, the user data manager module 295 may extract information about the intent for performing a function associated with the connection to a network (e.g., Wireless Fidelity (Wi-Fi)). According to an embodiment, the user data manager module 295 may extract intents of the specified number. For example, the specified number may be selected by the user. According to an embodiment, the user data manager module 295 may generate an intent set including the extracted intent.

According to an embodiment, the intelligent server 200 may train the criterion for extracting the intent, using artificial intelligence (AI). In other words, the criterion for extracting the intent in the user terminal 100 may be updated through machine learning.

According to an embodiment, the user data manager module 295 may transmit the information about the extracted intent to the NLU management module 291. For example, the extracted information may include at least one voice input corresponding to the extracted intent. According to an embodiment, the NLU management module 291 may generate an NLU model for recognizing a specified intent, using the received voice input and may provide the generated NLU model to the user terminal 100. As such, the intelligent server 200 may provide the user terminal 100 with the personalized natural language recognition model.

According to an embodiment, the user terminal 100 may include the second natural language platform 170. According to an embodiment, the second natural language platform 170 may include a second ASR module 171, the second NLU module 173, a second planner module 175, and a second TTS module 177. For example, the second ASR module 171, the second NLU module 173, the second planner module 175, and the second TTS module 177 may be embedded modules for performing a specified function. According to an embodiment, the user terminal 100 may be similar to the user terminal 100 of FIG. 1. For example, the user terminal 100 may additionally include the configuration of the user terminal 100 of FIG. 1, as well as the configuration illustrated in FIG. 4A.

According to an embodiment, the user terminal 100 may receive a voice input. According to an embodiment, the user terminal 100 may process the received voice input through the second ASR module 171, the second NLU module 173, and the second planner module 175. For example, the second ASR module 171, the second NLU module 173, and second planner module 175 of the user terminal 100 may process the voice input, similarly to the first ASR module 221, the first NLU module 223, and the first planner module 225 of the intelligent server 200. According to an embodiment, the second NLU module 173 may determine the intent of the received voice input. The second NLU module 173 may determine the intent corresponding to the voice input, using the NLU model.

According to an embodiment, the user terminal 100 may process only the voice input corresponding to the intents of the limited number, through the second ASR module 171, the second NLU module 173, and the second planner module 175. For example, the intent capable of being recognized by the user terminal 100 may be a part of intents capable of being recognized by the intelligent server 200.

According to an embodiment, when the user terminal 100 directly processes the received voice input, the user terminal 100 may rapidly process the received voice input, compared with the case where the voice input is processed through the intelligent server 200. However, the user terminal 100 may process only the voice inputs of the specified number due to the limitation of hardware performance. According to an embodiment, the user terminal 100 may complementarily process the received voice input together with the intelligent server 200. For example, the user terminal 100 may directly process the voice input corresponding to the intent at the recognized frequency; for another example, the user terminal 100 may directly process the voice input corresponding to the intent corresponding to the intent selected by a user. According to an embodiment, the user terminal 100 may process the voice input corresponding to the remaining intents through the intelligent server 200.

According to an embodiment, the intent capable of being recognized by the user terminal 100 may be changed (or updated) through the intelligent server 200. According to an embodiment, the intent capable of being recognized by the user terminal 100 may be determined based on the usage history of the user. In other words, the changed intent may be determined based on the usage history of the user. According to an embodiment, the user terminal 100 may receive the NLU model corresponding to the determined intent, from the intelligent server 200. According to an embodiment, the user terminal 100 may store the received NLU model in a database. For example, the user terminal 100 may store the NLU model corresponding to the determined intent in the database instead of the previously stored NLU model.

According to an embodiment, the user terminal 100 may generate a voice signal for interacting with a user through the second TTS module 177. The second TTS module 177 of the user terminal 100 may generate the voice signal, similarly to the first TTS module 229 of the intelligent server 200.

As such, the integrated intelligence system 10 may provide the user with the personalized voice input processing service by changing (or updating) the intent capable of being recognized by the user terminal 100 using user data. The user terminal 100 may rapidly provide the response corresponding to the voice input, which is frequently used or selected by the user.

Figure 4B:
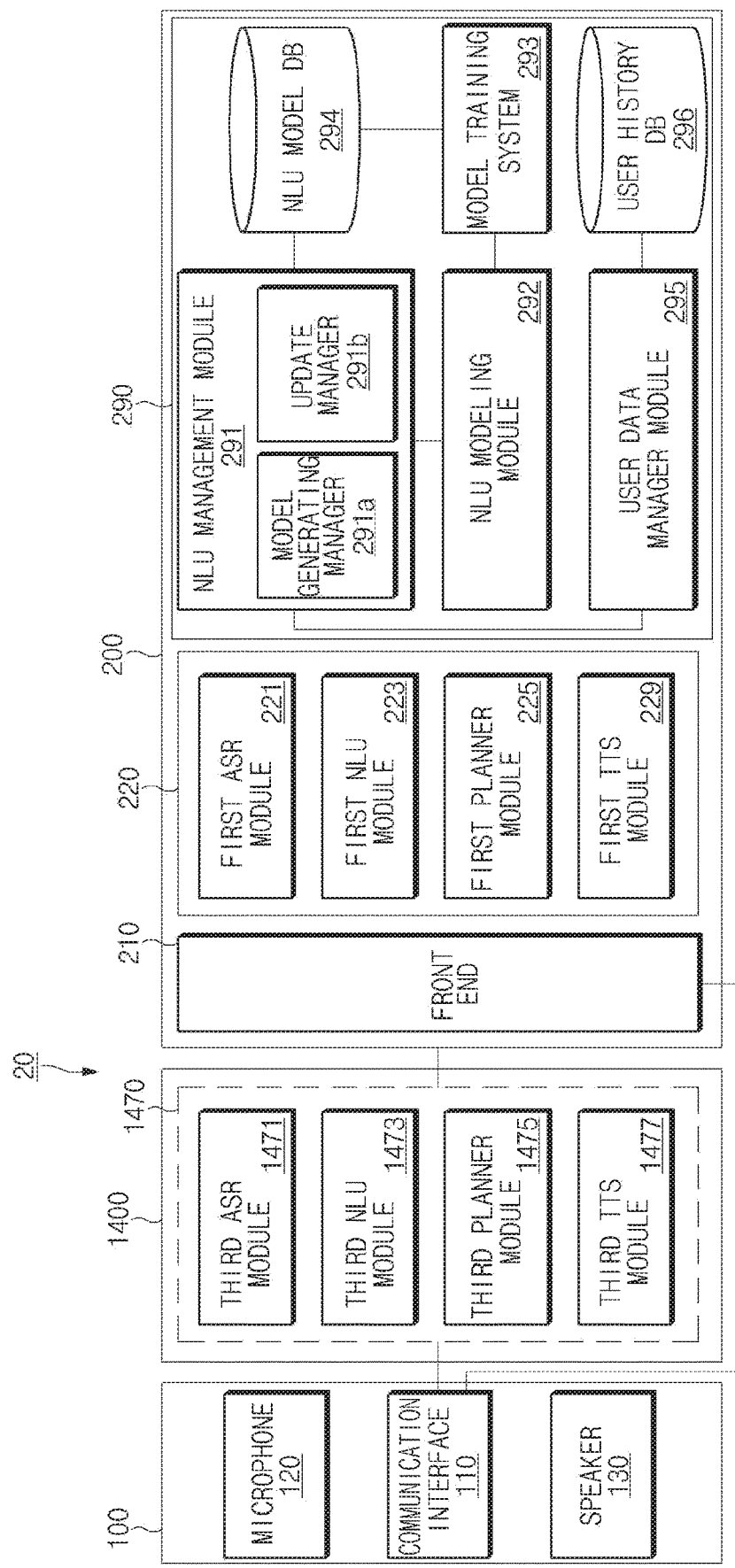
FIG. 4B illustrates another example of an intelligence system including a plurality of natural language platforms, according to an embodiment.

FIG. 4B illustrates another example of an intelligence system including a plurality of natural language platforms, according to an embodiment. The configuration of the user terminal 100 illustrated in FIG. 4B is one possible configuration, and the user terminal 100 may further include at least one of components illustrated in FIG. 1, 4A, or 8, in addition to the configuration illustrated in FIG. 4B.

Referring to FIG. 4B, an integrated intelligence system 20 may further include an edge server 1400 between the user terminal 100 and the intelligent server 200. According to an embodiment, the edge server 1400 may include at least one of a mobile edge computing (MEC) server or a fog computing server. The edge server 1400 may be positioned at a location that is geographically closer to the user terminal 100 than the intelligent server 200. For example, the edge server 1400 may be positioned inside or around the base station that provides wireless communication to the user terminal 100. When the user terminal 100 requires low latency, the user terminal 100 may transmit or receive data to and from the edge server 1400 located at a geographically close location, instead of transmitting or receiving data to and from the intelligent server 200.

According to an embodiment, the edge server 1400 may include a third natural language platform 1470 including the function of an on-device natural language platform (e.g., the second natural language platform 170 of FIG. 4A). The third natural language platform 1470 may perform a function the same as or similar to the function of the second natural language platform 170. The third natural language platform 1470 may include a third ASR module 1471, a third NLU module 1473, a third planner module 1475, and a third TTS module 1477. The edge server 1400 may compensate for the limitation of the hardware performance of the user terminal 100 while providing data at a low latency, by replacing the function of the second natural language platform 170. Although not illustrated in FIG. 4B, the edge server 1400 may further include a module performing the function of a front end (e.g., 201 of FIG. 4B) configured to transmit data to the user terminal 100 or the intelligent server 200.

For example, when the user terminal 100 receives a user utterance through the microphone 120, the user terminal 100 may generate a voice signal corresponding to the received user utterance. The user terminal 100 may make a request for processing of the voice input, by transmitting the voice input to the edge server 1400 through the communication interface 110. The edge server 1400 may process the voice input received through the third natural language platform 1470. For example, the third ASR module 1471 may convert the voice input received from the user terminal 100 to text data. The third NLU module 1473 may determine the user's intent corresponding to the voice input; the third planner module 1475 may generate a plan according to the determined intent; the third TTS module 1477 may generate the voice signal for interacting with the user. The user terminal 100 may receive the voice signal and then may output guide information through the speaker 130.

According to an embodiment, the edge server 1400 may quickly process the voice signal compared with the intelligent server 200, while replacing the function of the user terminal 100. However, because the hardware performance of the edge server 1400 is limited compared to the hardware performance of the intelligent server 200, the number of voice inputs capable of being processed by the third natural language platform 1470 may be limited. In this case, the edge server 1400 may induce the user terminal 100 to process a voice signal through the intelligent server 200.

For example, when the intent determined by the third NLU module 1473 is less than a specified level, the edge server 1400 may determine that the recognition of the intent fails. The specified level may be referred to as the confidence level. For example, the specified level may be a specified probability (e.g., 50%). When the determined intent is less than the specified level, the edge server 1400 may make a request for the processing of the voice signal to the intelligent server 200. For another example, the edge server 1400 may transmit information indicating that the determined intent is less than the specified level, to the user terminal 100. The user terminal 100 may make a request for the processing of the voice signal to the intelligent server 200. The intelligent server 200 may process the voice signal through the first natural language platform 220 and may transmit the processed result to the user terminal 100.

Figure 5:
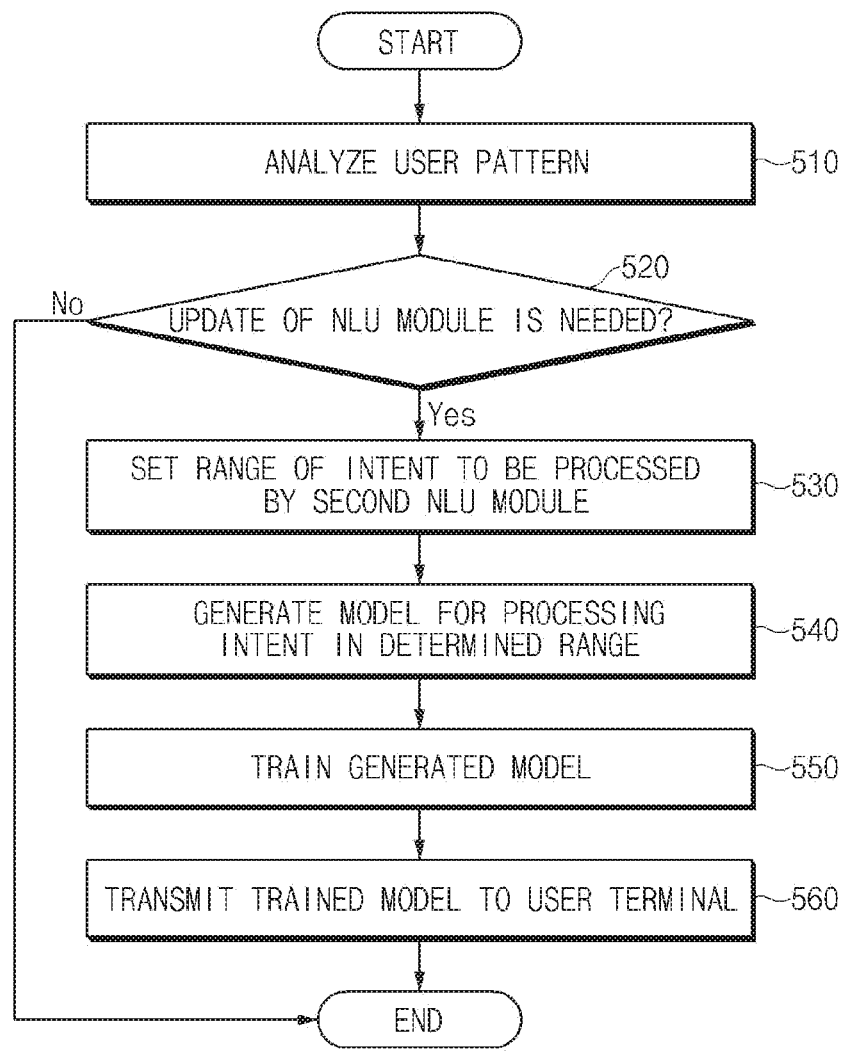
FIG. 5 is a flowchart illustrating a method of changing (or updating) an intent recognition model of a user terminal, according to an embodiment.

FIG. 5 is a flowchart illustrating a method of changing (or updating) an intent recognition model of a user terminal, according to an embodiment.

Referring to FIG. 5, the intelligent server 200 may change (or update) the voice recognition model of a user terminal (e.g., the user terminal 100 of FIG. 4A) for processing the voice inputs of the limited number in a user history, based on the recognition frequency of the intent corresponding to the voice input.

According to an embodiment, in operation 510, the intelligent server 200 (e.g., the user data manager module 295 of FIG. 4A) may analyze a user pattern. For example, the intelligent server 200 may analyze the pattern of the voice input. The intelligent server 200 may determine whether the specified intent is recognized more than the specified number of times.

According to an embodiment, in operation 520, the intelligent server 200 (e.g., the NLU management module 291 of FIG. 4A) may determine whether the update of the NLU module (e.g., the second NLU module 173 of FIG. 4A) of a user terminal is needed. For example, when the increment of the recognition frequency of the specified intent is not less than a specified value, the intelligent server 200 may determine that the update of the user terminal is needed. For another example, when different preference information is changed, the intelligent server 200 may determine that the update of the user terminal is needed. For example, when a user's favorite app or intent is changed (e.g., deleted or registered), the intelligent server 200 may receive the changed information. For another example, when the information associated with the user terminal 100 is changed, the intelligent server 200 may determine that the update of the user terminal is needed. For example, when another device logged in with the same user account is connected or when the same device is logged with another user account, the intelligent server 200 may receive the changed information.

According to an embodiment, when there is no need for the update of the second NLU module 173 (No), the intelligent server 200 may terminate a procedure for changing the NLU model of the user terminal.

According to an embodiment, when the update of the second NLU module 173 is needed (Yes), in operation 530, the intelligent server 200 (e.g., the NLU management module 291 of FIG. 4A) may determine the range of the intent capable of being processed (or recognized) by the user terminal. For example, the intelligent server 200 may determine the intents of the specified number, which have the high recognition frequency, as the range of the intent capable of being recognized by the user terminal. For another example, the intelligent server 200 may determine all or part of intents included in the domain corresponding to an app, as the range of the intent capable of being recognized by the user terminal. For another example, the intelligent server 200 may determine the intent associated with the function to limit the connection to an external device, as the range of the intent capable of being recognized by the user terminal. For another example, the intelligent server 200 may determine the intent recognized by the specific kind of electronic device (e.g., an electronic device not including a display), within the range of the intent capable of being recognized by the user terminal.

According to an embodiment, in operation 540, the intelligent server 200 (e.g., the NLU modeling module 292 of FIG. 4A) may generate a natural language recognition model for recognizing the intent included in the determined range.

According to an embodiment, in operation 550, the intelligent server 200 (e.g., the model training system 293 of FIG. 4A) may repeatedly train the model for recognizing the specified intent. As such, the intelligent server 200 may generate an NLU model for accurately recognizing the specified intent.

According to an embodiment, in operation 560, the intelligent server 200 (e.g., the NLU management module 291 of FIG. 4A) may transmit the generated NLU module to the user terminal 100. For example, the NLU module may be the personalized NLU model.

As such, the intelligent server 200 may implement the personalized voice processing system by changing (or updating) the intent recognized by the user terminal 100 using user data.

Figure 6A:
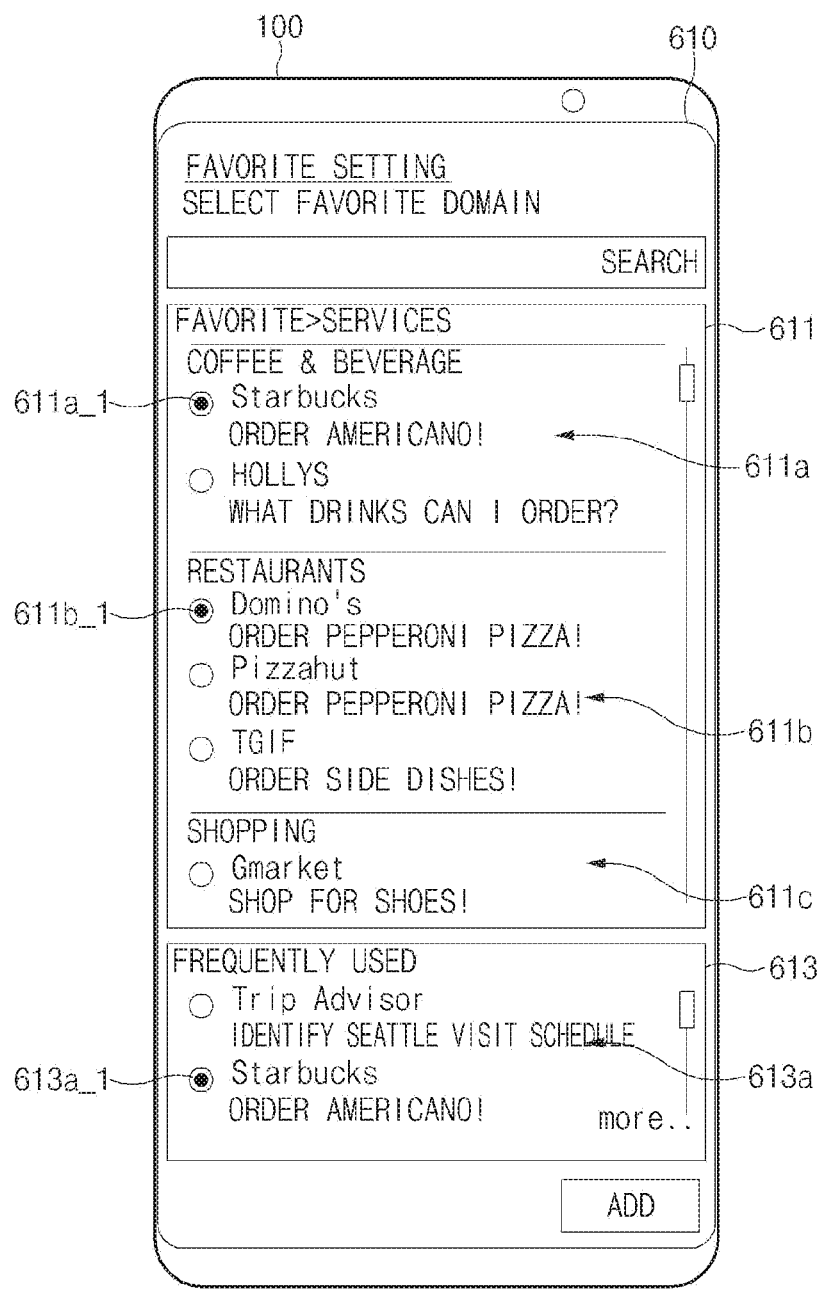
FIG. 6A is a view illustrating a screen for setting the intent recognized by a user terminal depending on an app installed in the user terminal, according to an embodiment.

FIG. 6A is a view illustrating a screen for setting the intent recognized by a user terminal depending on an app installed in the user terminal, according to an embodiment.

Referring to FIG. 6A, the user terminal 100 may receive a user input to select the intent capable of being recognized by the user terminal 100. The user terminal 100 may generate preference information of a user associated with an app, based on the user input.

According to an embodiment, the user terminal 100 may display a first user interface (UI) 610 for receiving the user input, on a display (e.g., the display 140 of FIG. 1).

According to an embodiment, the user terminal 100 may display at least one app list 611 or 613 on the first UI 610. For example, the user terminal 100 may display the first app list 611, which is separated for each service, on the UI 610. For example, the first app list 611 may include an app (e.g., Starbucks and Hollys) 611*a* associated with coffee & beverages, an app (e.g., Domino's, Pizzahut, and TGIF) 611*b* associated with restaurants, and an app (e.g., Gmarket) 611*c* associated with shopping. The user terminal 100 may display the second app list 613 displayed based on a usage frequency, on the UI 610. The second app list 613 may include an app (e.g., Trip Advisor and Starbucks) 613*a* that is executed more than the specified number of times during a specified period. According to an embodiment, the apps included in the first app list 611 and the second app list 613 may be duplicated. As such, the user terminal 100 may receive a user input to select an app through the list 611 or 613 of an app.

According to an embodiment, the user terminal 100 may display the intent capable of being recognized by each app, in the list 611 or 613 of an app. For example, the user terminal 100 may display a representative utterance (e.g., identify my order) corresponding to a part of the recognizable intent. As such, the user terminal 100 may provide information about the intent capable of being recognized by the selected app.

According to an embodiment, the user terminal 100 may receive a user input to select an app through the app list 611 or 613. For example, the user terminal 100 may receive a user input to select an app (e.g., Starbucks or Dominos's) for each service in the first app list 611. Because intents for performing the similar function are duplicated, one app may be selected for each service. According to an embodiment, the user terminal 100 may display the selected app in the app list 611 or 613. For example, the user terminal 100 may display the selected app (e.g., Starbucks or Dominos's) through indicators 611*a*_1, 611*b*_1, and 613*a*_1.

According to an embodiment, the user terminal 100 may transmit information about the selected app to the intelligent server 200. In other words, the user terminal 100 may transmit preference information to the intelligent server 200. According to an embodiment, the intelligent server 200 may generate an NLU model for recognizing all or part of the intents included in the domain corresponding to the selected app and may transmit the generated NLU model to the user terminal 100. For example, the generated NLU model may be the personalized NLU model.

As such, the user terminal 100 may process a voice input for performing the function of the app selected by the user. In other words, the user terminal 100 may directly recognize the intent included in the domain corresponding to the selected app.

Figure 6B:
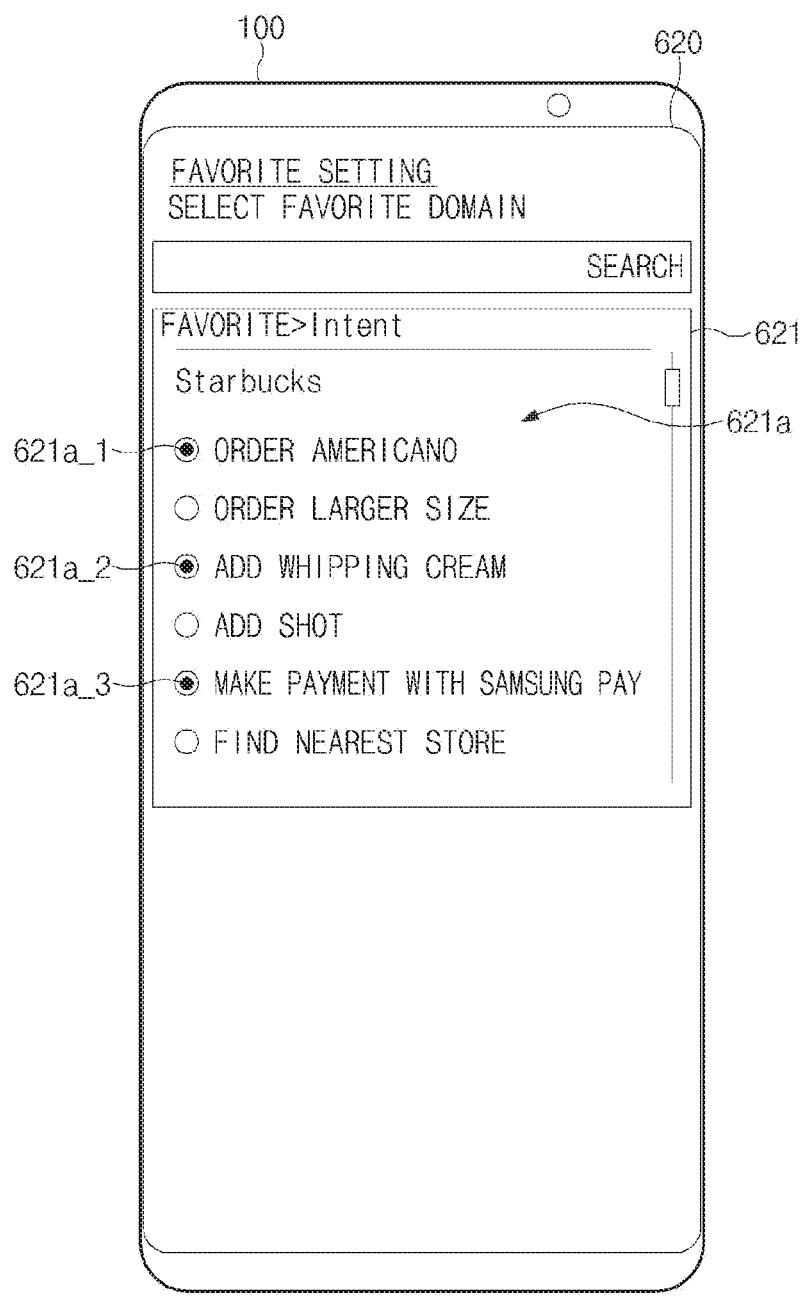
FIG. 6B is a view illustrating a screen for setting the intent processed by a user terminal depending on the intent for performing the function of an app of a user terminal, according to an embodiment.

FIG. 6B is a view illustrating a screen for setting the intent processed by a user terminal depending on the intent for performing the function of an app of a user terminal, according to an embodiment.

Referring to FIG. 6B, the user terminal 100 may receive a user input to select the intent capable of being recognized by the user terminal 100. The user terminal 100 may generate preference information of a user associated with the intent, based on the user input.

According to an embodiment, the user terminal 100 may display a second UI 620 for receiving a user input, in a display.

According to an embodiment, the user terminal 100 may display an intent list 621 for performing the specified function of the specified app, on the second UI 620. According to an embodiment, the specified app may be an app selected by a user. For example, the intent list 621 may include a representative utterance (e.g., "order americano" or "add whipping cream") 621*a* corresponding to at least one intent. According to an embodiment, when receiving a user input to select an app through the app list 611 or 613 of the first UI 610 of FIG. 6A, the user terminal 100 may display the intent list 621 of the selected app on the second UI.

According to an embodiment, the user terminal 100 may receive a user input to select at least one intent through the intent list 621. According to an embodiment, the user terminal 100 may display the selected intent in the intent list 621. For example, the user terminal 100 may display the selected app (e.g., "order americano", "add whipping cream", and "make a payment with Samsung Pay") through indicators 621*a*_1, 621*a*_2, and 621*a*_3.

According to an embodiment, the user terminal 100 may transmit information about the selected intent to the intelligent server 200. For example, the selected intent may be the intent for performing the function of the app selected by a user. As such, the user terminal 100 may transmit the information about the selected app as well as the information about the selected intent to the intelligent server 200. According to an embodiment, the intelligent server 200 may generate an NLU model for recognizing the selected intent and may transmit the generated NLU model to the user terminal 100. For example, the generated NLU model may be the personalized NLU model.

As such, the user terminal 100 may process a voice input for performing the function selected by the user. In other words, the user terminal 100 may directly recognize the intent corresponding to the selected function.

Figure 7:
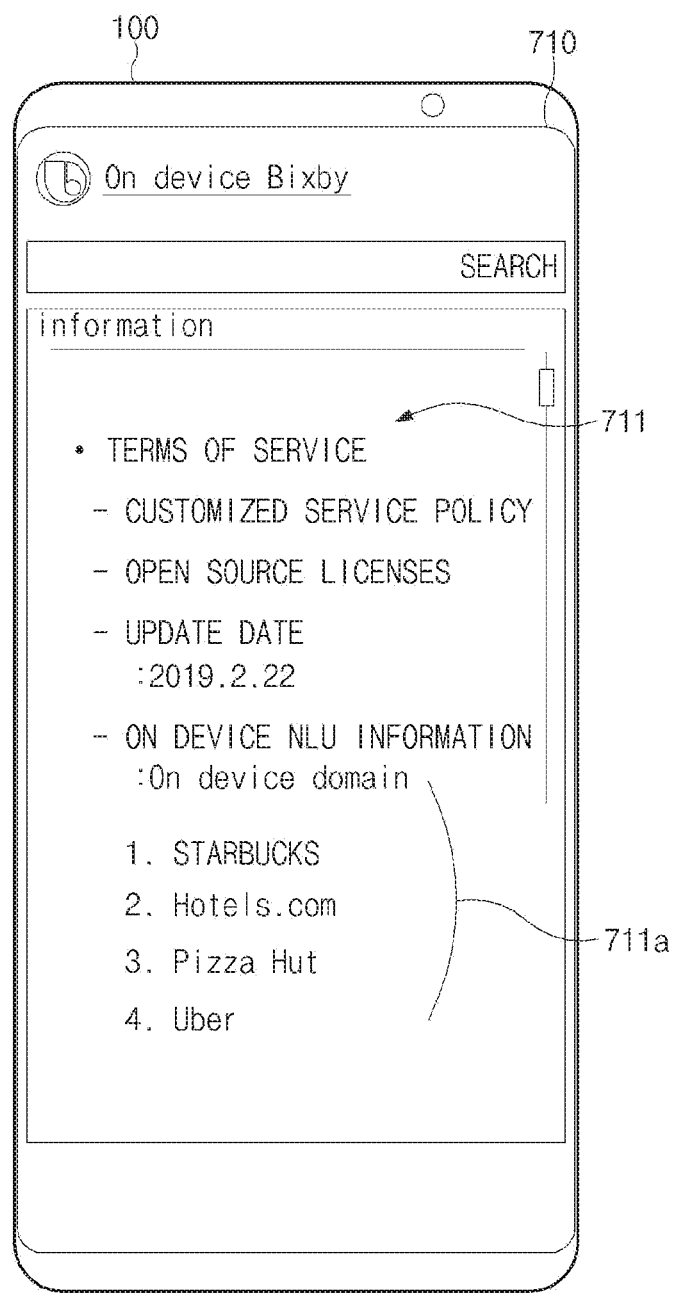
FIG. 7 is a view illustrating a screen for providing a user with information about the intent capable of being recognized by a user terminal, according to an embodiment.

FIG. 7 is a view illustrating a screen for providing a user with information about the intent capable of being recognized by a user terminal, according to an embodiment.

Referring to FIG. 7, the user terminal 100 may provide information 711 about a voice input processing system through a UI 710.

According to an embodiment, the user terminal 100 may provide state information of the voice input processing system. For example, the user terminal 100 may provide information about terms of service of the voice input processing system, service policy information, license information, and update information.

According to an embodiment, the user terminal 100 may provide information 711*a* associated with the intent capable of being directly recognized by the user terminal 100. For example, the user terminal 100 may provide the information 711*a* of an app performing the function corresponding to the intent capable of being directly recognized by the user terminal 100. For example, the information of the app may be the name of an app.

According to embodiments disclosed in the disclosure, the integrated intelligence system 10 or 20 described with reference to FIGS. 1 to 7 may provide the personalized voice input recognizing system by changing (or updating) a natural language understanding model of a user terminal for recognizing intents of the limited number by using user data. As such, the integrated intelligence system 10 or 20 may provide a rapid response corresponding to a voice input.

Figure 8:
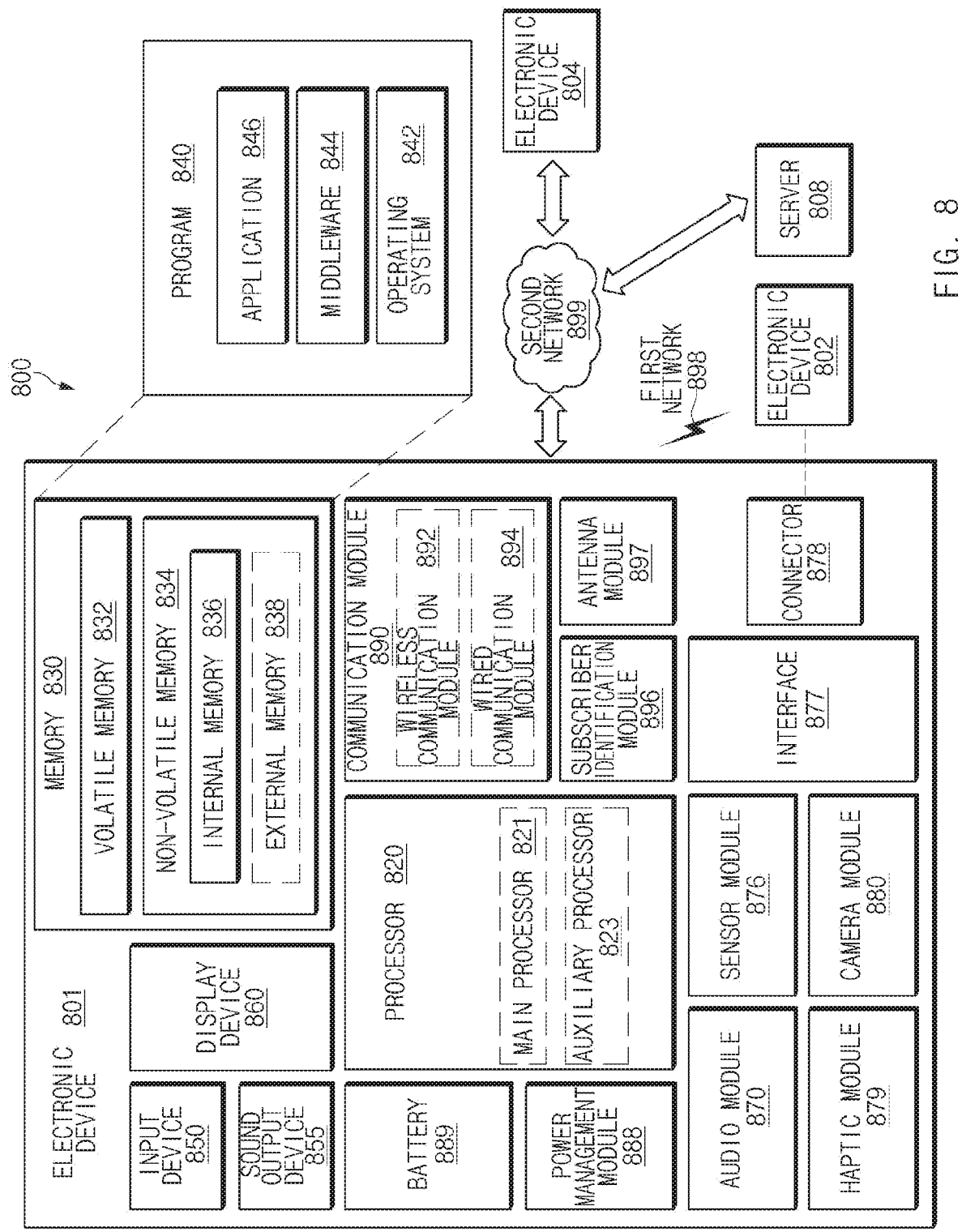
FIG. 8 illustrates a block diagram of an electronic device in a network environment, according to various embodiments.

FIG. 8 is a block diagram illustrating an electronic device 801 in a network environment 800 according to various embodiments. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, a keyboard, or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., PCB). According to an embodiment, the antenna module 897 may include a plurality of antennas. In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

As described above, a system may include at least one communication interface, at least one processor operatively connected to the at least one communication interface, and at least one memory operatively connected to the at least one processor and storing a plurality of natural language understanding (NLU) models. The at least one memory may store instructions that, when executed, cause the processor to receive first information associated with a user from an external electronic device associated with a user account, using the at least one communication interface, to select at least one of the plurality of NLU models, based on at least part of the first information, and to transmit the selected at least one NLU model to the external electronic device, using the at least one communication interface such that the external electronic device uses the selected at least one NLU model for natural language processing.

According to an embodiment, the first information may include at least one of a voice input of the user, information of the external electronic device, or preference information of the user.

According to an embodiment, the instructions may cause the processor to select at least one of the plurality of NLU models when the number of times that the specified voice input of the user is received is not less than a specified value during a specified period.

According to an embodiment, the instructions may cause the processor to select at least one of the plurality of NLU models when the information associated with the external electronic device is changed.

According to an embodiment, the instructions may cause the processor to select at least one of the plurality of NLU models when the preference information of the user is changed.

According to an embodiment, the instructions may cause the processor to generate text data by processing voice data of the user received from the external electronic device using an automatic speech recognition (ASR) model.

According to an embodiment, the instructions may cause the processor to determine an intent corresponding to the voice input and to select the at least one NLU model based on at least one voice input corresponding to the specified intent when determining a specified intent more than a specified count.

According to an embodiment, the instructions may cause the processor to select an NLU model corresponding to the intent of a specified number.

According to an embodiment, the instructions may cause the processor to select the at least one NLU model corresponding to an intent for performing a function of a specified application program.

According to an embodiment, the instructions may cause the processor to select the at least one NLU model corresponding to an intent selected by the user.

As described above, a controlling method of a system for updating an NLU model may include receiving first information associated with a user from an external electronic device associated with a user account, selecting at least one of the plurality of NLU models, based on at least part of the first information, and transmitting the selected at least one NLU model to the external electronic device, using at least one communication interface such that the external electronic device uses the selected at least one NLU model for natural language processing.

According to an embodiment, the first information may include at least one of a voice input of the user, information of the external electronic device, or preference information of the user.

According to an embodiment, the selecting of the at least one of the plurality of NLU models may include when the number of times that the specified voice input of the user is received is not less than a specified value during a specified period, selecting at least one of the plurality of NLU models.

According to an embodiment, the selecting of the at least one of the plurality of NLU models may include selecting at least one of the plurality of NLU models when the information of the external electronic device is changed.

According to an embodiment, the selecting of the at least one of the plurality of NLU models may include selecting at least one of the plurality of NLU models when the preference information of the user is changed.

According to an embodiment, the method may further include generating text data by processing voice data of the user received from the external electronic device using an ASR model.

According to an embodiment, the selecting of the at least one of the plurality of NLU models may include determining an intent corresponding to the voice input and selecting the at least one NLU model based on at least one voice input corresponding to the specified intent when determining a specified intent more than a specified count.

According to an embodiment, the selecting of the at least one NLU model based on the at least one voice input corresponding to the specified intent may include selecting an NLU model corresponding to the intent of a specified number.

According to an embodiment, the selecting of the at least one NLU model based on the at least one voice input corresponding to the specified intent may include selecting the at least one NLU model corresponding to an intent for performing a function of a specified application program.

According to an embodiment, the selecting of the at least one NLU model based on the at least one voice input corresponding to the specified intent may include selecting the at least one NLU model corresponding to an intent determined by the user.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, the integrated intelligence system may provide the personalized voice input recognizing system by changing (or updating) a natural language understanding model of a user terminal for recognizing intents of the limited number by using user data. As such, the integrated intelligence system may provide a response corresponding to a rapid voice input.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A server comprising:
   a communication interface;
   a processor operatively connected to the communication interface; and
   a memory operatively connected to the processor and configured to store a plurality of natural language understanding (NLU) models and instructions that, when executed by the processor, cause the processor to:
   receive, from an external electronic device associated with a user account using the communication interface, first information associated with a user, the first information including a voice input of the user, an intent of the user determined by the external electronic device, and at least one of:
      information of the external electronic device or
      preference information of the user;
   based on a number of times that a specified voice input of the user is received not being less than a specified value during a specified period, select at least one of the plurality of NLU models based on at least part of the first information; and
   transmit the selected at least one of the plurality of NLU models of the external electronic device using the communication interface such that the external electronic device uses the selected at least one of the plurality of NLU models for natural language processing.

2. The server of claim 1, wherein the memory stores instructions that, when executed by the processor, cause the processor to:
   based on the information of the external electronic device being changed, select at least one of the plurality of NLU models.

3. The server of claim 1, wherein the memory stores instructions that, when executed by the processor, cause the processor to:
   based on the preference information of the user being changed, select at least one of the plurality of NLU models.

4. The server of claim 1, wherein the memory stores instructions that, when executed by the processor, cause the processor to:
   generate text data by processing voice data of the user received from the external electronic device using an automatic speech recognition (ASR) model.

5. The server of claim 1, wherein the memory stores instructions that, when executed by the processor, cause the processor to:
   identify an NLU model corresponding to an intent of a specified number.

6. The server of claim 1, wherein the memory stores instructions that, when executed by the processor, cause the processor to:
   select at least one NLU model corresponding to an intent for performing a function of a specified application program.

7. The server of claim 1, wherein the memory stores instructions that, when executed by the processor, cause the processor to:
   select at least one NLU model corresponding to an intent selected by the user.

8. A controlling method of a system for updating an NLU model, the method comprising:
   receiving, from an external electronic device associated with a user account, first information associated with a user, the first information including a voice input of the user, an intent of the user determined by the external electronic device, and at least one of:

information of the external electronic device or preference information of the user;

selecting at least one of a plurality of natural language understanding (NLU) models based on at least part of the first information, wherein the at least one of the plurality of NLU models is selected based on a number of times that a specified voice input of the user is received not being less than a specified value during a specified period; and transmitting the selected at least one of the plurality of NLU models to the external electronic device using at least one communication interface such that the external electronic device uses the selected at least one of the plurality of NLU models for natural language processing.

9. The method of claim 8, wherein the at least one of the plurality of NLU models is selected based on the information of the external electronic device being changed.

10. The method of claim 8, wherein the at least one of the plurality of NLU models is selected based on the preference information of the user being changed.

11. The method of claim 8, further comprising:
generating text data by processing voice data of the user received from the external electronic device using an ASR model.

12. The method of claim 8, wherein the at least one of the plurality of NLU models is selected based on the voice input corresponding to a specified intent includes:
identifying an NLU model corresponding to an intent of a specified number.

13. The method of claim 8, wherein the at least one of the plurality of NLU models is selected based on the voice input corresponding to a specified intent includes:
identifying the at least one of the plurality of NLU models corresponding to an intent for performing a function of a specified application program.

14. The method of claim 8, wherein the at least one of the plurality of NLU models is selected based on the voice input corresponding to a specified intent includes:
identifying the at least one the plurality of NLU models corresponding to an intent determined by the user.

* * * * *